United States Patent
Iwaizono

(12) 
(10) Patent No.: US 6,577,105 B1
(45) Date of Patent: Jun. 10, 2003

(54) CIRCUIT AND DEVICE FOR PROTECTING SECONDARY BATTERY

(75) Inventor: Yoshinori Iwaizono, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/743,539

(22) PCT Filed: May 17, 2000

(86) PCT No.: PCT/JP00/03160

§ 371 (c)(1),
(2), (4) Date: Jan. 11, 2001

(87) PCT Pub. No.: WO00/70702

PCT Pub. Date: Nov. 23, 2000

(30) Foreign Application Priority Data

May 17, 1999 (JP) .......................................... 11-135325
Jul. 23, 1999 (JP) .......................................... 11-209766

(51) Int. Cl.⁷ .............................................. H01M 10/46
(52) U.S. Cl. ........................ 320/134; 320/136; 320/150
(58) Field of Search .................................. 320/127, 128, 320/134, 136, 150, 153

(56) References Cited

U.S. PATENT DOCUMENTS

| 5,146,150 A | * | 9/1992 | Gyenes et al. |
| 5,691,621 A | * | 11/1997 | Phuoc et al. |
| 5,796,239 A | * | 8/1998 | Van Phuoc et al. |
| 6,166,516 A | * | 12/2000 | Albright et al. |

FOREIGN PATENT DOCUMENTS

| JP | 8-65907 | 3/1996 |
| JP | 8-116627 | 5/1996 |
| JP | 10-12282 | 1/1998 |
| JP | 10-51962 | 2/1998 |
| JP | 2872365 | 1/1999 |
| JP | 11-113178 | 4/1999 |

OTHER PUBLICATIONS

Robert A. Mammano, "Charging the New Batteries–IC Controller Track New Technologies", IEEE AESS Systems Magazine, 1995, pp. 20–25.

* cited by examiner

*Primary Examiner*—Edward H. Tso
(74) *Attorney, Agent, or Firm*—Jordan and Hamburg LLP

(57) ABSTRACT

A protective circuit for protecting a rechargeable battery from battery breakdown caused by prolonged overcharging, and a protective element incorporated in this circuit are provided. A main protective circuit is equipped with main control means for shutting off a first FET or a second FET when any of overcharging, overdischarging, or excessive discharge current is detected. A sub-protective circuit is equipped with sub-control means for shutting off a third FET when the anti-overcharging function of the main control means is not operating properly.

30 Claims, 11 Drawing Sheets

CIRCUIT AND DEVICE FOR PROTECTING SECONDARY BATTERY

BACKGROUND OF THE INVENTION

The present invention relates to a protective circuit and a protective element incorporated therein for protecting a rechargeable battery such as a lithium ion rechargeable battery against overcharging.

Charging of rechargeable batteries beyond their suitable charge conditions leads to the generation of gas or heat due to decomposition of electrolyte and may cause breakdown or deterioration of the battery. Lithium-based rechargeable batteries are particularly susceptible to deterioration or damage when operated at a voltage exceeding a predetermined range. It is therefore the normal practice to provide a battery protection device for protecting the battery from improper use.

The battery protection devices include those which are mounted in the rechargeable battery itself as a PTC (Positive Temperature Coefficient) element or a current shutoff valve, and those configured as a circuit substrate on which is formed a battery protective circuit that shuts off the charging and discharging circuit of the rechargeable battery in response to an abnormal state, for instance. The above-mentioned PTC device is serially connected to the charging and discharging circuit of the rechargeable battery, and generates heat itself when subjected to an excessively large current, thereby preventing the further flow of the excessively large current through a rapid increase in resistance caused by the rise in temperature. With a relatively large rechargeable battery, this PTC device is provided inside the sealing assembly of the battery. The above-mentioned current shutoff valve is normally installed in the sealing assembly, and when gas is generated within the rechargeable battery, it is deformed by the rise in internal pressure and breaks when the internal pressure exceeds a permissible value, thereby releasing the gas and, through its breakage, shutting off the flow of current to the charging and discharging circuit. PCT elements and current shutoff valves are well known as mechanisms provided in relatively large, cylindrical, lithium ion rechargeable batteries.

The above-mentioned battery protective circuit is disclosed, for example, in Japanese Patent No. 2,872,365, and is configured as shown in FIG. 12. The voltage of a rechargeable battery 30 is detected by a control means 33, and when a voltage over a predetermined charge-permitting voltage is detected, a MOSFET 31 serially connected to a charging and discharging circuit is put in an OFF state, whereby the charging and discharging circuit is shut off, and charging current is impeded. When a voltage below a predetermined discharge-permitting voltage is detected, a MOSFET 32 serially connected to the charging and discharging circuit is put in an OFF state, whereby the charging and discharging circuit is shut off, and discharging current is impeded. This control allows the rechargeable battery 30 to be protected against damage or diminished performance due to overcharging or overdischarging.

However, when the battery protective circuit is not operating properly, and particularly when the anti-overcharging function is not operating, there is the danger that the electrolyte will decompose as the overcharging state progresses and that the rechargeable battery 30 will be ruptured by the gas generated as the temperature rises. In view of this, as shown in FIG. 13, a battery protective circuit configuration has been proposed in which there are provided a control means 34 for preventing overcharging, overdischarging, and over-current, and an overcharging control means 36 for halting the overcharging state if this control means 34 should malfunction.

With this configuration, the control means 34 prevents overcharging, overdischarging, and over-current, and when an operational aberration occurs, such as a breakdown or malfunction in the ability of this control means 34 to prevent overcharging, a voltage corresponding to an overcharging state is detected by the overcharging control means 36, and the overcharging control means 36 puts the MOSFET 35 in an ON state. When this MOSFET 35 is turned ON, a resistor 18 generates heat which melts a heat-coupled temperature fuse 19, shutting off the charging and discharging circuit of the rechargeable battery 30.

It is thereby possible to avoid a prolonged overcharging state, which is the most detrimental state for the rechargeable battery 30 to be in. Since the structure for preventing overcharging is provided redundantly, and the generation of gas due to a prolonged overcharging state is prevented, it is also possible to eliminate the above-mentioned current shutoff valve that mechanically shuts off the power circuit.

Nevertheless, although an anti-overcharging circuit that is redundantly provided as in the above conventional structure was indeed effective at preventing battery breakdown due to a prolonged overcharging state, because the second control means, which was actuated when something was amiss with the first control means, actuated a non-resettable shutoff means, the operation thereof could not be tested, so it was impossible to ensure proper operation and obtain high reliability by testing individual operating states. The proper operation of an overcharging protective circuit is essential with rechargeable batteries of high energy density, such as a lithium ion rechargeable battery, and it is necessary to be able to ensure the reliability of individual batteries or battery packs by testing the operation of the protective circuit.

Meanwhile, a temperature fuse, heating means, and so forth are parts that cannot be incorporated into an integrated circuit, and therefore require their own installation space, and this hinders designing a compact battery pack using small rechargeable batteries, or designing a rechargeable battery with an attached protective circuit in which the protective circuit is integrated with the rechargeable battery.

Making rechargeable batteries smaller is very important in terms of making portable devices more compact, and even with this smaller size, the energy density per unit of volume still needs to be increased. An effective means for achieving this is to use an electrical rather than mechanical current shutoff valve to shut off the power circuit, and we are awaiting the development of a protective circuit that effectively protects a rechargeable battery from a prolonged overcharging state, with a smaller structure for the electrical shutoff of the power circuit than that in prior art, as well as a protective element used in this protective circuit.

It is an object of the present invention to provide a protective circuit with a compact structure that affords reliable protection of a rechargeable battery, and at the same time, a protective element that is compatible with this protective circuit.

DISCLOSURE OF THE INVENTION

To achieve the stated object, the present invention provides a battery protective circuit incorporated in a rechargeable battery, comprising:

a first switching means and a second switching means connected in series in a charge/discharge circuit of the rechargeable battery;

a main protective circuit for
- detecting a battery voltage between positive and negative electrodes of the rechargeable battery;
- turning on the first switching means when the battery voltage is below a charge-prohibiting voltage, above which charging of the rechargeable battery must be prohibited; and
- turning off the first switching means when the battery voltage is detected to be higher than said charger-prohibiting voltage, and maintaining the OFF state of the first switching means until the detected voltage becomes below a charge-permitting voltage that is lower than said charge-prohibiting voltage; and a sub-protective circuit for
- detecting the battery voltage between the positive and negative electrodes of the rechargeable battery;
- turning on the second switching means when the battery voltage is below a second charge-prohibiting voltage which is higher than the first charge-prohibiting voltage; and
- turning off the second switching means when the battery voltage is detected to be higher than the second charge-prohibiting voltage.

With the above structure, even in the event of a breakdown or malfunction of the main protective circuit, the sub-protective circuit detects the overcharging and shuts off the charging and discharging circuit of the rechargeable battery. This affords a redundant overcharging protective circuit, which more effectively prevents the overcharging of the rechargeable battery and keeps the overcharging from progressing to the point of the breakdown of the rechargeable battery. This redundant overcharging protection allows the operation of overcharging protective circuits to be tested for each circuit, and makes possible more reliable battery protection. Also, since a redundant overcharging protective circuit allows overcharging to be effectively prevented, there is none of the gas generation that would accompany overcharging, making it possible to eliminate mechanisms such as a gas escape valve for releasing abnormal internal pressure in a battery caused by gas generation. Therefore, no space is needed for providing such gas escape valve or the like, making it easier to design a compact rechargeable battery. Also, since the circuit can be made up of semiconductor elements, the protective circuit can consist of an integrated circuit, making it possible to reduce the size of a battery pack and fit the protective circuit inside a rechargeable battery.

In the above structure, the sub-protective circuit turns off the second switching means through detection of the second charge-prohibiting voltage, and maintains this OFF state until a second charge-permitting voltage is detected. Specifically, the second charge-permitting voltage is set below the first charge-prohibiting voltage, the result of which is that the second switching means is turned OFF by the sub-protective circuit, rendering charging impossible. Also, the shutoff operation of the second switching means prevents the circuit from returning from an OFF state to an ON state, and the state of overcharging protection from being ended, due to a decrease in battery voltage when the charging circuit is opened.

Alternatively, the sub-protective circuit may fix the OFF state of the second switching means after the second charge-prohibiting voltage has been detected. By fixing the OFF state of the second switching means when overcharging is detected, the rechargeable battery can be reliably protected against loss of battery protection function caused by malfunction of the main protective circuit.

The first and second switching means may be constructed of power MOSFETs having parasitic diodes therein, and connected such that the forward direction of the parasitic diodes is the discharge direction of the rechargeable battery. Thereby, even if the first and second switching means are in a shutoff state due to the detection of an overcharging state, discharge will be possible through the parasitic diodes, and the rechargeable battery can be used even in a state in which the anti-overcharging function has been actuated.

To achieve the stated object, the present invention also provides a battery protective circuit incorporated in a rechargeable battery, comprising:

a first switching means and a second switching means connected in series in a charge/discharge circuit of the rechargeable battery;

a main protective circuit for controlling the first switching means in accordance with a battery voltage across positive and negative electrodes of the rechargeable battery and a discharge current of the rechargeable battery; and a sub-protective circuit for controlling the second switching means in accordance with the battery voltage across positive and negative electrodes of the rechargeable battery, wherein:

the first switching means and the second switching means are turned on, when the rechargeable battery is in a normal condition wherein the voltage across the positive and negative electrodes of the rechargeable battery is within a range above a discharge-prohibiting voltage and below a first charge-prohibiting voltage, said discharge-prohibiting voltage being a limit value below which discharging of the rechargeable battery must be prohibited, and said charge-prohibiting voltage being a limit value above which charging of the rechargeable battery must be prohibited;

the first switching means is turned OFF when the detected discharge current is above a predetermined value;

the first switching means is put in a charging direction OFF/discharging direction ON state when the detected voltage is above said first charge-prohibiting voltage, and maintained in said charging direction OFF/discharging direction ON state until a first charge-permitting voltage, that is lower than the first charge-prohibiting voltage, is detected;

the first switching means is put in a discharging direction OFF/charging direction ON state when the detected voltage is below said discharge-prohibiting voltage, and maintained in said discharging direction OFF/charging direction ON state until a discharge-permitting voltage, that is higher than said discharge-prohibiting voltage is detected;

the second switching means is turned off when the detected voltage is above a second charge-prohibiting voltage, which is higher than said first charge-prohibiting voltage, and maintained in the OFF state until a second charge-permitting voltage, that is lower than said second charge-prohibiting voltage, is detected.

With the above structure, the main protective circuit detects the voltage and discharge current of the rechargeable battery, and during normal operation puts the rechargeable battery in a usable state by turning ON switching elements, but in response to an abnormal state, this main protective circuit either turns OFF the first switching means or renders it capable of only charging or discharging. If something should go amiss in this main protective circuit, such as a breakdown or malfunction, and it should stop preventing overcharging, then the sub-protective circuit detects the overcharging and shuts off the charging and discharging circuit of the rechargeable battery so there is a redundant overcharging protective circuit, with which the overcharging of the rechargeable battery is effectively prevented, and overcharging is kept from progressing to the point of the breakdown of the rechargeable battery. This redundant overcharging protection allows for the individual testing of the operation of these circuits, and makes possible more reliable battery protection. Also, since a redundant overcharging protective circuit allows overcharging to be effectively prevented, there is none of the gas generation that would accompany overcharging, eliminating the need for space to provide a gas escape valve or the like and facilitating the design of a compact rechargeable battery. Also, the circuit can be made up of semiconductor elements, so the protective circuit can consist of an integrated circuit, making it possible to reduce the size of a battery pack and fit the protective circuit inside a rechargeable battery.

In the above structure, the first switching means is an FET with no parasitic diode in its interior, and the various ON/OFF states are assumed according to the gate voltage thereof. Thus a single FET can prevent overcharging, overdischarging, and over-current, which allows the battery protective circuit to be more compact.

To achieve the stated object, the present invention also provides a battery protective circuit incorporated in a rechargeable battery, comprising:

a PTC device connected in series in a charge/discharge circuit of the rechargeable battery;
  heating means heat-coupled to the PTC element;
  a first switching means connected to the PTC device for controlling power supply to said heating means;
  a second switching means connected in series in the charge/discharge circuit of the rechargeable battery;
  a main protective circuit for
    detecting a battery voltage between positive and negative electrodes of the rechargeable battery;
    turning off the first switching means when the detected voltage is below a first charge-prohibiting voltage, above which charging of the rechargeable battery must be prohibited; and
    turning on the first switching means for supplying power to the heating means when the detected voltage is above the first charge-prohibiting voltage, and maintaining said ON state of the first switching means until a first charge-permitting voltage, that is lower than said first charge-prohibiting voltage, is detected; and
  a sub-protective circuit for
    detecting the battery voltage between the positive and negative electrodes of the rechargeable battery;
    turning on the second switching means when the detected voltage is below a second charge-prohibiting voltage that is higher than the first charge-prohibiting voltage; and
    turning off the second switching means when the detected voltage is above the second charge-prohibiting voltage, and maintaining the OFF state of the second switching means until a second charge-permitting voltage, which is lower than said second charge-prohibiting voltage, is detected.

With the above structure, when an overcharging state is detected from the voltage of the rechargeable battery, the main protective circuit turns on the first switching means and sends power to the heating means, and the PTC device serially connected to the charging and discharging circuit of the rechargeable battery is heated by this heating means. The resistance of the PTC device increases rapidly as the temperature rises, which restricts charging current to the rechargeable battery and protects the battery from overcharging. If this main protective circuit should stop preventing overcharging due to a problem such as a breakdown or malfunction, then the sub-protective circuit detects the overcharging and shuts off the charging and discharging circuit of the rechargeable battery so there is a redundant overcharging protective circuit, with which the overcharging of the rechargeable battery is effectively prevented, and overcharging is kept from progressing to the point of the breakdown of the rechargeable battery. This redundant overcharging protection allows for the individual testing of the operation of these circuits, and makes possible more reliable battery protection. Also, since a redundant overcharging protective circuit allows overcharging to be effectively prevented, there is none of the gas generation that would accompany overcharging, making it possible to eliminate mechanisms such as a gas escape valve for releasing abnormal internal pressure in a battery caused by gas generation. Therefore, no space is needed for providing this gas escape valve or the like, making it easier to design a compact rechargeable battery. Also, the circuit can be made up of semiconductor elements, so the protective circuit can consist of an integrated circuit, making it possible to reduce the size of a battery pack and fit the protective circuit inside a rechargeable battery.

In the above structure, the heating means can be constructed of a second PTC device heat-coupled to the first PTC device. Both PTC devices may be formed flat, so that a good heat-coupling state can be obtained when two PTC devices are joined together on their flat sides. Thus the charge current-restricting construction can be made compact, since it is only necessary to send power to the second PTC device, thereby heating the first PTC device and increasing its resistance.

To achieve the stated object, the present invention also provides a battery protective circuit for a rechargeable battery, comprising:

voltage detection means connected in series between positive and negative electrodes of the rechargeable battery for detecting a battery voltage and outputting a control signal when a voltage exceeding a predetermined value is detected;
  a PTC device serially connected to the voltage detection means;
  heating means, which heats up by electrical conduction, connected to the voltage detection means and heat-coupled to the PTC device; and
  switching means for turning on the heating means in accordance with the control signal from the voltage detection means.

Power is sent to the heating means by the actuation of the switching means through a control signal outputted when the voltage detection means detects a voltage exceeding a specific value, such as the voltage resulting from prolonged overcharging, and the heating means heats the heat-coupled PTC device. A PTC device is characterized by exhibiting a positive coefficient resistance change with respect to temperature, and in particular by entering a tripped state in which resistance increases rapidly above a specific critical temperature. Normally, the resistance is very low and the drop in voltage caused by input and output current of the rechargeable battery is so small that it does not interfere with the input and output circuit, but when an excessively large current flows in, self-generation of heat results in a sharp increase in resistance, which prevents excessive current flow. The resistance of this PTC device rises sharply by the elevated temperature when heated by the heating means, and this restricts the current of the input and output circuit of the rechargeable battery. Therefore, when the voltage detection means detects a voltage indicating an abnormal state such as a prolonged overcharging state, the tripping of the PTC device restricts the input and output current of the rechargeable battery so damage to the rechargeable battery due to prolonged overcharging is prevented.

In the above structure, the heating means can consist of a second PTC device heat-coupled to the above-mentioned PTC device. When power is sent to the second PTC device and the temperature raised, the heat-coupled PTC device is heated and the PTC device tripped.

The present invention also provides a battery protective circuit for a rechargeable battery, comprising:

voltage detection means connected in series between positive and negative electrodes of a rechargeable battery for detecting a battery voltage and outputting a control signal when a voltage exceeding a predetermined value is detected;

a temperature fuse serially connected to the rechargeable battery;

a heating PTC device heat-coupled to the temperature fuse; and switching means for turning on the heating PTC device in accordance with the control signal from the voltage detection means.

Power is sent to the heating PTC device by the actuation of the switching means through a control signal outputted when the voltage detection means detects a voltage exceeding a specific value, such as the voltage resulting from prolonged overcharging, and the heating PTC device raises the temperature through current flow, which melts the heat-coupled temperature fuse. Therefore, the input and output circuit of the rechargeable battery is shut off when the voltage detection means detects a voltage indicating an abnormal state such as a prolonged overcharging state, so damage to the rechargeable battery due to prolonged overcharging is prevented.

In the above structures, the rechargeable battery is redundantly protected against overcharging damage by setting the voltage exceeding a specific value detected by the voltage detection means to be higher than the voltage at which an overcharging state is detected. Specifically, when a control circuit that detects a state such as overcharging or overdischarging and shuts off the input and output circuit of the rechargeable battery is separately configured, the initial value of the overcharging state is detected by this control circuit and overcharging is prevented, but if something goes wrong with this control circuit, rupture or other such damage to the rechargeable battery can be caused by prolonged overcharging. If the structure is such that the voltage detection means outputs a control signal through the detection of a voltage higher than the above-mentioned initial value, a voltage raised by prolonged overcharging will be detected, action will be taken to prevent overcharging, and the rechargeable battery will be protected even if something goes wrong with the control circuit.

The present invention also provides a protective element incorporated in a battery protective circuit for a rechargeable battery, comprising a plurality of PTC devices formed in a flat shape and laminated in a heat-coupled state. One of the PTC devices is serially connected to the rechargeable battery, and another PTC device is connected to a power control circuit controlling the power conduction thereof. When power is sent to the second PTC device heat-coupled to the PTC device on the side serially connected to the rechargeable battery, the heating caused by current flow raises the temperature of the PTC device serially connected to the rechargeable battery, which sharply increases the resistance and trips the PTC device, at which point the input and output current of the rechargeable battery is restricted. Thus the plurality of PTC devices effectively act as a protective element for the rechargeable battery, by constructing the power control circuit such that power is sent to the PTC device on the heated side upon detection of an abnormal state in the rechargeable battery such as overcharging.

In the above structure, the PTC devices can comprise a combination of shapes, sizes, and electrical characteristics selected as desired, and a suitable combination can be selected according to the configuration of the protective circuit.

To be more specific, the PTC device may be constituted with two PTC elements formed in a flat shape and joined together via an electrode material interposed between the flat sides thereof, each of the PTC elements being respectively provided with electrode materials joined to their outer sides, so that the PTC device will take up less space.

The electrode materials may be formed from a copper-nickel alloy or a clad material made from a copper-nickel alloy and nickel, so that the product will lend itself very well to soldering and welding, and will also have excellent electrical and thermal conductivity. The use of these materials facilitates work and enhances electrical and mechanical performance.

Leads can also be formed extending from the electrode materials, which facilitates circuit connections.

Leads can also be formed extending from the electrode materials in two mutually opposite directions, or in various different directions, the selection of which can be made according to the circuit configuration.

The electrode materials may be formed in smaller outer dimensions than the PTC elements to which they are joined, so that it will be easier to obtain a good solder joint between the electrode materials and the PTC devices.

The present invention also provides a protective element incorporated in a battery protective circuit for a rechargeable battery comprising a temperature fuse and a PTC device heat-coupled to the temperature fuse. When the temperature fuse is serially connected to the rechargeable battery, and the PTC device is connected to the power control circuit that controls the power conduction thereof, the heating caused by current flow melts the temperature fuse and shuts off the input and output current of the rechargeable battery. Thus the temperature fuse and PTC device will effectively act as a protective element for the rechargeable battery, by constructing the power control circuit such that power is sent to the PTC device upon detection of an abnormal state in the rechargeable battery such as overcharging.

The plurality of heat-coupled PTC devices may be covered with a thermally insulating material, so that the diffusion of heat will be suppressed and heat coupling will be more effective.

BEST MODE FOR CARRYING OUT THE INVENTION

Embodiments of the present invention will now be described through reference to the appended figures to facilitate an understanding of the present invention. The embodiments given below are specific examples of the present invention, and are not intended to limit the technological scope thereof.

Figure 1:
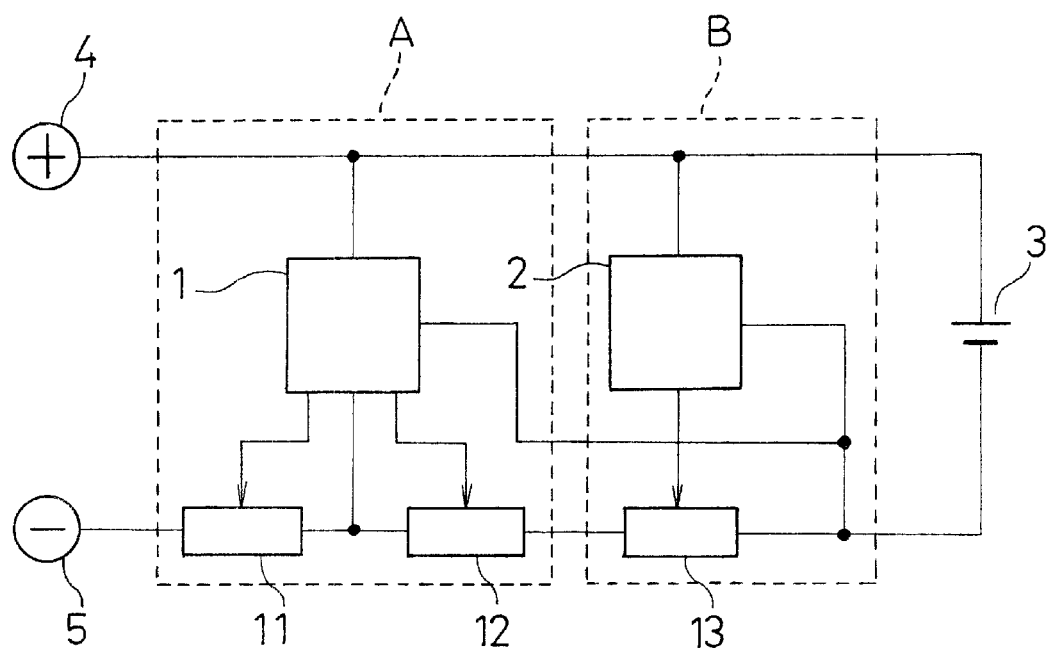
FIG. 1 is a block diagram of the structure of the battery protective circuit according to a first embodiment of the present invention.

FIG. 1 is a block diagram of the structure of the battery protective circuit according to a first embodiment of the present invention. A rechargeable battery 3, comprising a lithium ion rechargeable battery here, is equipped with a main protective circuit A that protects the battery against overcharging, overdischarging, and over-current, and a sub-protective circuit B that redundantly protects the rechargeable battery 3 against overcharging in conjunction with the main protective circuit A.

In FIG. 1, a first FET (first switching means) 11 and a second FET 12 that make up the main protective circuit A are serially connected to a third FET (second switching means) 13 that makes up the sub-protective circuit B between the negative electrode side of the rechargeable battery 3 and a negative input/output terminal 5. The first to third FETs 11 to 13 each make use of a power MOSFET, with the first and second FETS 11 and 12 being switched ON and OFF by a main control means 1, and the third FET 13 being switched ON and OFF by a sub-control means 2. Under the normal charging and discharging conditions of the rechargeable battery 3, these FETs are all in an ON state, so that the negative electrode of the rechargeable battery 3 and the negative input/output terminal 5 are connected in an ON state, and the rechargeable battery 3 is connected between a positive input/output terminal 4 and the negative input/output terminal 5.

The main control means 1 detects the voltage across the positive and negative electrodes of the rechargeable battery 3, and if the result is over a predetermined first charge-prohibiting voltage (such as 4.30 V) which is deemed an overcharging state, then the first FET 11 is turned OFF to shut off charging current and protect the rechargeable battery 3 from overcharging. There is the danger that the electrolyte in the rechargeable battery 3 will be decomposed by overcharging and that battery damage will be caused by the attendant gas generation, but the rechargeable battery 3 can be protected against damage by this anti-overcharging function. The first FET 11 is kept OFF by the main control means 1 until a first charge-permitting voltage that is lower than the first charge-prohibiting voltage is detected.

When the main control means 1 detects the voltage across the positive and negative electrodes of the rechargeable battery 3 and finds it to be under a predetermined discharge-prohibiting voltage (such as 2.60 V) which is deemed an overdischarging state, then the second FET 12 is turned OFF to shut off discharging current and protect the rechargeable battery 3 from overdischarging. The performance of the rechargeable battery 3 is diminished by overcharging, but this deterioration of the rechargeable battery 3 can be prevented by this anti-overdischarging function. The second FET 12 is kept OFF by the main control means 1 until a discharge-permitting voltage that is higher than the discharge-prohibiting voltage is detected.

When the main control means 1 detects the voltage across the terminals of the second FET 12 and finds it to be over a predetermined voltage corresponding to an excessively large discharging current, then the first and second FETS 11 and 12 are turned OFF to shut off the discharging current and protect the rechargeable battery 3 against damage due to excessively large discharging current. The rechargeable battery 3 will be exposed to an excessively large discharging current if a short-circuit occurs between the positive input/output terminal 4 and the negative input/output terminal 5, or at the device to which these are connected, but, even though its internal resistance is small (20 to 50 mΩ), since the voltage at both terminals of the FET 12 rises in response to an excessively large discharging current, the over-current can be shut off in advance by detecting this voltage rise.

Thus, the first main protective circuit A is equipped with a function of preventing overcharging, overdischarging, and over-current, so if it is incorporated along with the rechargeable batteries 3 into a battery pack, the rechargeable batteries 3 will be protected against damage caused by device malfunction or improper use. If the main protective circuit A should operate abnormally, however, the rechargeable batteries 3 will be severely damaged. If this abnormal operation is a malfunction of the main protective circuit A, then the gas generation caused by the decomposition of electrolyte as overcharging proceeds can lead to an abnormal increase in battery internal pressure, and elevated temperature can eventually cause the rechargeable battery 3 to rupture. The above-mentioned current shutoff valve is installed to guard against such abnormal increases in battery internal pressure, but if the rechargeable battery 3 is small and thin, it is difficult to include a current shutoff valve inside the battery, so reliable operation cannot be ensured. If overcharging could be effectively prevented, then the above-mentioned current shutoff valve could be eliminated, allowing even small, thin rechargeable batteries 3 to be protected.

The sub-protective circuit B is provided in order to redundantly protect the rechargeable battery against overcharging. If the anti-overcharging function of the main protective circuit A is not working properly, then overcharging is prevented by this sub-protective circuit B. The sub-protective circuit B detects the voltage of the rechargeable battery 3 using the sub-control means 2, and if it detects a voltage over a second charge-prohibiting voltage (such as 4.45 V) that is higher than the first charge-prohibiting voltage detected by the main control means 1 for the purpose of preventing overcharging, then the third FET 13 is turned OFF and kept OFF until a second charge-permitting voltage is detected, thereby shutting off charging current.

Figure 2:
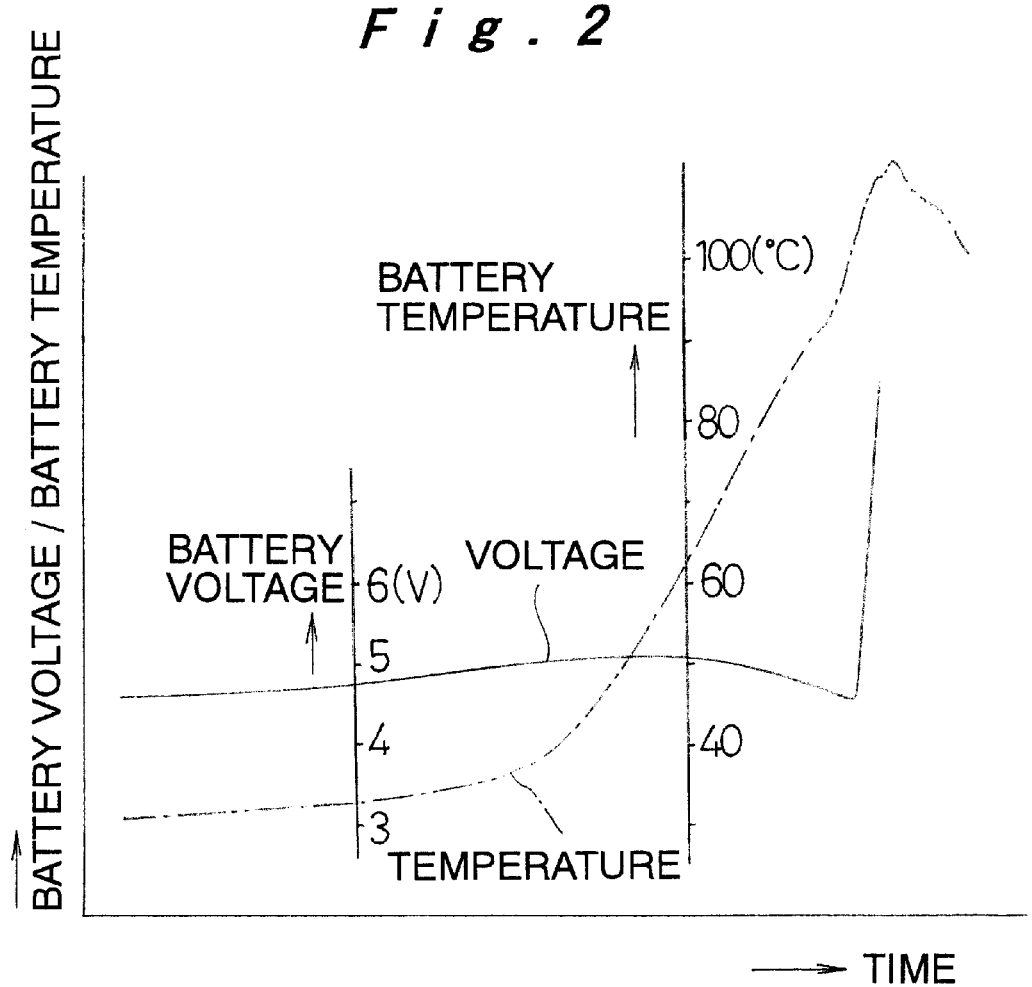
FIG. 2 is a graph of the change in battery temperature and battery voltage during prolonged overcharging.

FIG. 2 is a voltage/temperature-time graph obtained with the circuit of the rechargeable battery 3 during prolonged overcharging. If the anti-overcharging function of the main protective circuit A is not working properly, then battery voltage steadily rises as overcharging proceeds, leading to a sharp rise in battery temperature. Since the battery voltage exceeds 4.5 V at the point when the battery temperature begins to rise sharply, if the second charge-prohibiting voltage is set to 4.45 V as described above in the sub-control means 2 of the sub-protective circuit B, then when this second charge-prohibiting voltage is detected, the third FET 13 will be turned OFF by the sub-control means 2, and charging current will be shut off before the battery temperature begins to rise sharply, whereby battery damage due to prolonged overcharging will be prevented.

Figure 3:
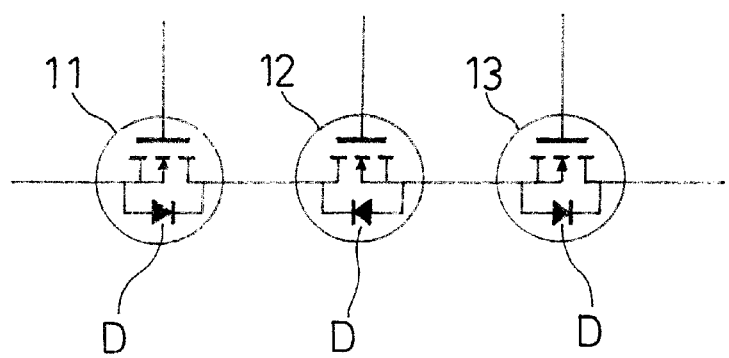
FIG. 3 is an FET circuit diagram illustrating parasitic diodes built into MOSFETS.

As shown in FIG. 3, the first to third FETs 11 to 13 used in the battery protective circuit according to the first embodiment of the present invention as described above have parasitic diodes D between their drains and sources, so even when the first FET 11 or the third FET 13 has been turned OFF in order to prevent overcharging, discharge of the rechargeable battery 3 will still be possible because the parasitic diodes D of the first and third FETs 11 and 13 are connected so that the forward direction thereof is the discharging current direction. Also, if the second FET 12 has been turned OFF in order to prevent overcharging, charging of the rechargeable battery 3 will still be possible because the parasitic diode D of the second FET 12 is connected so that the forward direction thereof is the charging current direction.

Figure 4:
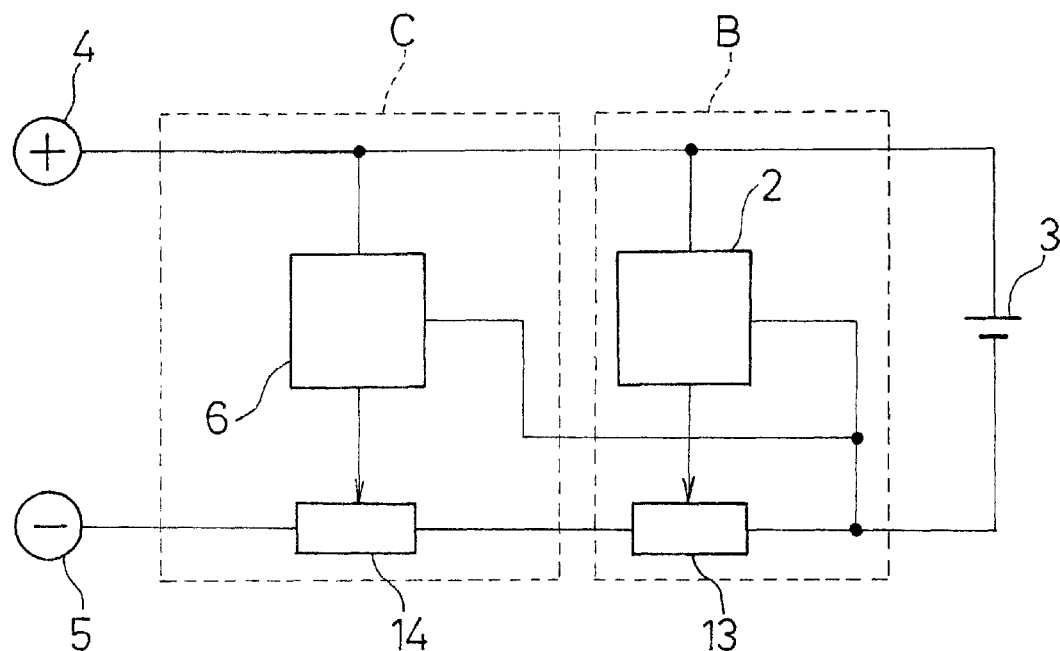
FIG. 4 is a block diagram of the structure of the battery protective circuit according to a second embodiment of the present invention.

A second embodiment of the present invention will now be described. FIG. 4 is a block diagram of the structure of the battery protective circuit according to the second embodiment of the present invention. This battery protective circuit comprises a main protective circuit C and a sub-protective circuit B. The sub-protective circuit B is structured the same as in the first embodiment.

In FIG. 4, the main protective circuit C has a main control means 6 and a first FET 14 configured as an integrated circuit chip. The first FET 14 is operated in the following four states depending on the gate voltage applied from the main control means 6: (1) ON state, (2) OFF state, (3) charging direction ON/discharging direction OFF, and (4) charging direction OFF/discharging direction ON. This main protective circuit C consisting of the main control means 6 and the first FET 14 is available as an integrated circuit chip from Unitrode Inc., and is disclosed in U.S. Pat. No. 5,581,170.

Unlike the first and second FETs 11 and 12 in the first embodiment, the first FET 14 does not have a parasitic diode D, and operates as a single switching element in the above-mentioned four states according to changes in the gate voltage thereof.

Of these four states, the ON state occurs when the rechargeable battery 3 is in a normal usage state, in which the voltage of the rechargeable battery 3 detected by the second main control means 6 is within the normal range of charging and discharging conditions. The OFF state occurs when an excessively large discharging current over the permissible value is detected from the voltage between the terminals of the first FET 14, which is serially connected to the charging and discharging circuit of the rechargeable battery 3, at which point the charging and discharging circuit is shut off and the rechargeable battery 3 is protected against excessively large current. The charging direction ON/discharging direction OFF state occurs when a voltage corresponding to an overdischarging state of the rechargeable battery 3 is detected by the main control means 6, at which point the discharge direction is shut off and discharge halted until a discharge-permitting voltage is detected, while the charge direction is left ON to allow charging. The charging direction OFF/discharging direction ON state occurs when a voltage corresponding to an overcharging state of the rechargeable battery 3 is detected by the main control means 6, at which point the charge direction is shut off and charging halted until a charge-permitting voltage is detected, while the discharge direction is left ON to allow discharging.

The structure of this main protective circuit C protects the rechargeable battery 3 against overcharging, overdischarging, and over-current. However, as discussed in the first embodiment, the rechargeable battery 3 will be severely damaged if abnormal operation such as a malfunction or breakdown should occur in this main protective circuit C as well. In particular, if the anti-overcharging function should cease to work, the gas generation in the rechargeable battery 3 caused by decomposition of the electrolyte as the overcharging proceeds will lead to an abnormal increase in the battery internal pressure, and elevated temperature can eventually cause the rechargeable battery 3 to rupture. In view of this, as shown in FIG. 4, the sub-protective circuit B is provided to the main protective circuit C, thereby redundantly protecting the rechargeable battery 3 against overcharging that would make the rechargeable battery 3 susceptible to undergoing the severest rupture, and the battery protective circuit is able to effectively protect the rechargeable battery 3. Specifically, the sub-protective circuit B detects the voltage of the rechargeable battery 3 using the sub-control means 2, and a voltage over a second charge-prohibiting voltage (such as 4.45 V) that is higher than the first charge-prohibiting voltage detected by the main control means 1 for the purpose of preventing overcharging is detected when the main protective circuit C is not properly preventing overcharging, so in this case the FET 13 is turned OFF and kept OFF until the second charge-permitting voltage is detected, thereby shutting off charging current. The operation of this sub-protective circuit B results in the charging current being shut off before the battery temperature begins to rise sharply due to the progress of overcharging, and battery damage caused by prolonged overcharging is prevented.

Figure 5:
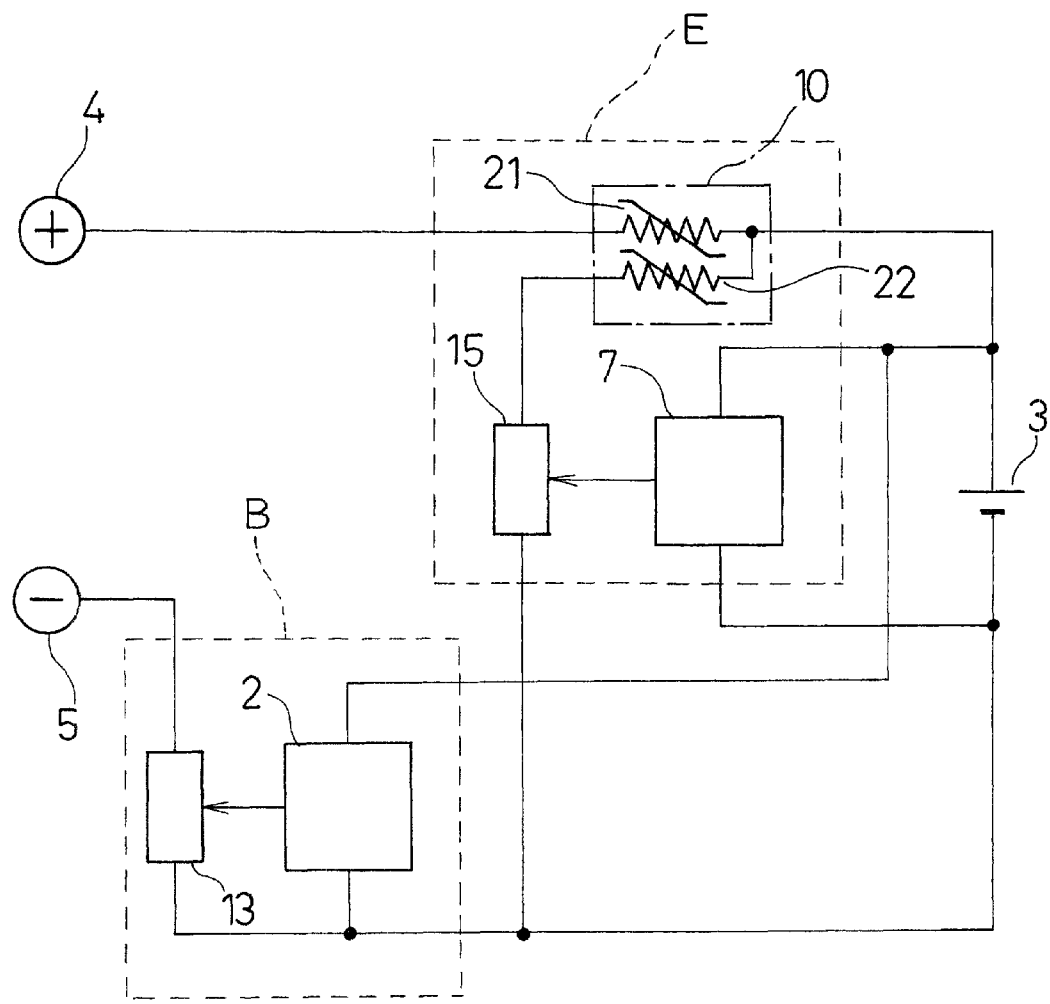
FIG. 5 is a block diagram of the structure of the battery protective circuit according to a third embodiment of the present invention.

A third embodiment of the present invention will now be described. FIG. 5 illustrates the battery protective circuit according to the third embodiment. This battery protective circuit comprises a main protective circuit E and a sub-protective circuit B. The sub-protective circuit B is structured the same as in the first and second embodiments.

In FIG. 5, the positive electrode side of the rechargeable battery 3 is connected to the positive input/output terminal 4 via a first PTC device 21 that constitutes the main protective circuit E, and a second PTC device (heating means) 22 is heat-coupled to the first PTC device 21 to constitute a protective element 10. As is commonly known, a PTC device is classified as a positive characteristic thermistor whose resistance increases rapidly when a specific temperature is exceeded due to heating or self-generation of heat when current flows. Normally, below this specific temperature, the resistance is extremely low, so the drop in voltage caused by current conduction is so small that it does not interfere with the input and output circuit.

The protective element 10 is formed in a heat-coupled state that facilitates the conduction of heat from the second PTC device 22 to the first PTC device 21, which is accomplished by the planar joining of the first PTC device 21 and the second PTC device 22, which are both formed in flat shapes. The construction of this protective element 10 will be discussed in detail in the fourth embodiment given below. The second PTC device 22 can be a heating means that quickly raises the temperature through the flow of current, such as a resistor or a heater.

The negative electrode side of the rechargeable battery 3 is connected to the negative input/output terminal 5 via the third FET 13 that constitutes the sub-protective circuit B, and when the rechargeable battery 3 is under normal charging and discharging conditions, the third FET 13 is turned ON by the sub-control means 2, and the negative electrode side of the rechargeable battery 3 is connected to the negative input/output terminal 5.

The main protective circuit E detects the voltage between the positive and negative electrodes of the rechargeable battery 3 using a main control means 7, and if the result is below a predetermined first charge-prohibiting voltage (such as 4.30 V), above which is deemed an overcharging state, then the first FET 15 is turned OFF. When a voltage exceeding the first charge-prohibiting voltage due to overcharging is detected, the main control means 7 turns on and keeps the first FET 15 ON until a first charge-permitting voltage lower than the first charge-prohibiting voltage is detected. A power conduction circuit is formed for the second PTC device 22 when the first FET 15 is ON, and the resulting heat that is generated heats the heat-coupled first PTC device 21. As a result of this heating, the first PTC device 21 goes into a tripped state in which resistance increases sharply, and this increased resistance restricts the current flowing in the charging and discharging circuit of the rechargeable battery 3, preventing the overcharging of the rechargeable battery 3.

However, as described in the first and second embodiments, the rechargeable battery 3 will be severely damaged if abnormal operation such as a malfunction or breakdown should occur in this main protective circuit E as well. In particular, if the anti-overcharging function should cease to work, the gas generation in the rechargeable battery 3 caused by decomposition of the electrolyte as the overcharging proceeds will lead to an abnormal increase in the battery internal pressure, and elevated temperature can eventually cause the rechargeable battery 3 to rupture. In view of this, as shown in FIG. 5, the sub-protective circuit B is used in conjunction with the main protective circuit E structured as above, thereby redundantly protecting the rechargeable battery 3 against overcharging that would make the rechargeable battery 3 susceptible to undergoing the severest rupture, and the battery protective circuit is able to effectively protect the rechargeable battery 3. Specifically, the sub-protective circuit B detects the voltage of the rechargeable battery 3 using the sub-control means 2, and a voltage over a second charge-prohibiting voltage (such as 4.45 V) that is higher than the first charge-prohibiting voltage detected by the main control means 1 for the purpose of preventing overcharging is detected when the main protective circuit E is not properly preventing overcharging, so in this case the FET 13 is turned OFF and kept OFF until the second charge-permitting voltage is detected, thereby shutting off charging current. The operation of this sub-protective circuit B results in the charging current being shut off before the battery temperature begins to rise sharply due to the progress of overcharging, and battery damage caused by prolonged overcharging is prevented.

A fourth embodiment of the present invention will now be described through reference to FIG. 6. The battery protective circuit according to the fourth embodiment comprises a main protective circuit A and a sub-protective circuit F. The main protective circuit A is structured the same as in the first embodiment.

Figure 6:
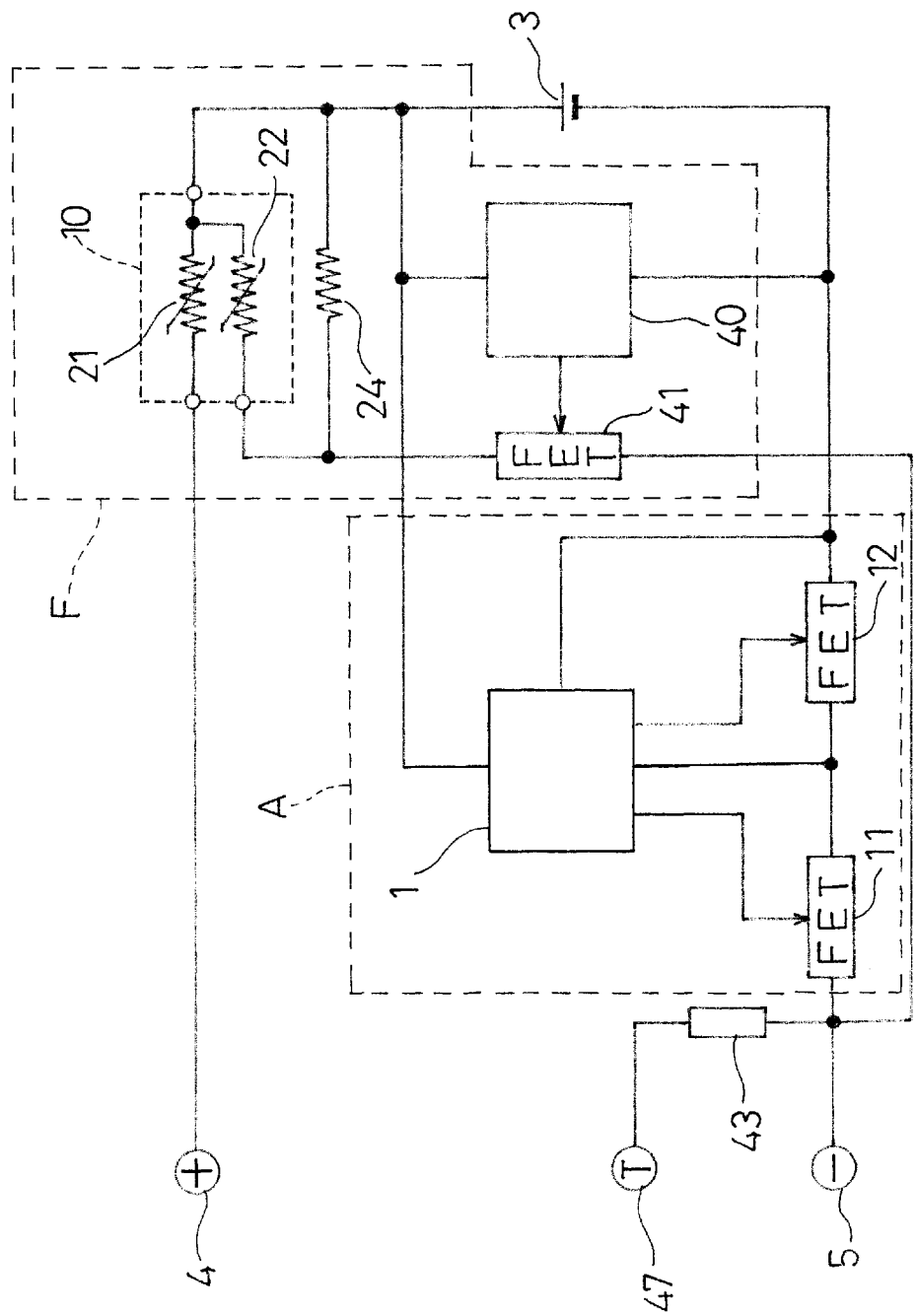
FIG. 6 is a block diagram of the structure of the battery protective circuit according to a fourth embodiment of the present invention.

In FIG. 6, the positive electrode side of the rechargeable battery 3 is connected to the positive input/output terminal 4 through the first PTC device 21 that constitutes the protective element 10, while the negative electrode side is connected to the negative input/output terminal 5 through the first FET 11 and the second FET 12. A thermistor 43 is connected to a temperature detection terminal 47 so that the temperature of the rechargeable battery 3 and the protective circuit can be detected from the device side, and particularly from a charger. The first PTC device 21 and the first FET 11 and second FET 12 thus serially disposed on the positive electrode side and the negative electrode side of the rechargeable battery 3 are provided in order to restrict or shut off current flow according to the various abnormal states of the rechargeable battery 3. The power circuit shutoff operation in the event of a malfunction will now be described.

Normally, when the temperature of the rechargeable battery 3 is below a specific level, the resistance of the first PTC device 21 is extremely low, so the drop in voltage caused by current conduction is so small that it does not interfere with the input and output circuit, but current in the power circuit is restricted by a rapid increase in resistance when the temperature rises over this specific level. This rapid increase in resistance is called tripping, in which the resistance increases by a factor of 10 to the third or fourth power over the normal level. This tripped state is brought about when the first PTC device 21 generates heat by itself as a result of the current flowing through it. When an excessively large current flows due to a short-circuit or the like, heat is generated and resistance increases sharply, restricting the input and output current of the rechargeable battery 3, so the damage to the rechargeable battery 3 by short-circuiting or the like is prevented.

The first and second FETs 11 and 12 operate as switching elements, and are turned ON and OFF by the main control means 1. Under normal charging and discharging conditions of the rechargeable battery 3, these FETs are connected in an ON state between the negative electrode of the rechargeable battery 3 and the negative input/output terminal 5.

The main control means 1 detects the voltage between the positive and negative electrodes of the rechargeable battery 3, and if the result is over a predetermined first charge-prohibiting voltage (such as 4.30 V) which is deemed an overcharging state, then the first FET 11 is turned OFF to shut off charging current and protect the rechargeable battery 3 from overcharging. Damage to the rechargeable battery 3 can be prevented by this anti-overcharging function. The first FET 11 is kept OFF by the main control means 1 until a first charge-permitting voltage that is lower than the first charge-prohibiting voltage is detected.

When the main control means 1 detects the voltage between the positive and negative electrodes of the rechargeable battery 3 and finds it to be under a predetermined discharge-prohibiting voltage (such as 2.60 V) which is deemed an overdischarging state, then the second FET 12 is turned OFF to shut off discharging current and protect the rechargeable battery 3 from overdischarging. A decrease in the performance of the rechargeable battery 3 can be prevented by this anti-overdischarging function. The second FET 12 is kept OFF by the main control means 1 until a discharge-permitting voltage that is higher than the discharge-prohibiting voltage is detected.

When the main control means 1 detects the voltage between the terminals of the second FET 12 and finds it to be over a predetermined voltage corresponding to an excessively large discharging current, then the first and second FETs 11 and 12 are turned OFF to shut off the discharging current and protect the rechargeable battery 3 against damage due to excessively large discharging current. The rechargeable battery 3 will be exposed to an excessively large discharging current if a short-circuit occurs between the positive input/output terminal 4 and the negative input/output terminal 5, or at the device to which these are connected, but, even though its internal resistance is small (20 to 50 mΩ), the voltage across both terminals of the second FET 12 rises in response to an excessively large discharging current, whereupon the over-current is shut off.

If the main protective circuit A should fail to properly function to turn OFF the power circuit, resulting in a prolonged overcharging state, there is the danger that the internal pressure of the rechargeable battery 3 will rise due to decomposition of electrolyte, which can lead to rupture of the rechargeable battery 3. The sub-protective circuit F is provided to handle such unexpected situations.

The sub-protective circuit F detects the voltage of the rechargeable battery 3 using a sub-control means 40, and turns ON a third FET 41 if this voltage is over the set voltage. Turning ON the third FET 41 sends power to the second PTC device 22 and a discharge resistor 24 formed as the protective element 10 through heat-coupling with the first PTC device 21. This turning ON of the third FET 41 raises the temperature of the second PTC device 22 and heats and trips the heat-coupled first PTC device 21, and the rapid increase in the resistance thereof restricts the flow of charging current to the rechargeable battery 3.

The set voltage at which the third FET 41 is turned ON by the sub-control means 40 is set to a detected voltage value that is larger than the charge-prohibiting voltage at which the main control means 1 detects overcharging. For instance, if the voltage at which charging has been completed is set on the charger side to 4.20 V, then the charge-prohibiting voltage for the main control means 1 is set to 4.30 V, and the detected set voltage in a prolonged overcharging state for the sub-control means 40 is set to 4.45 V. As shown in FIG. 2, battery voltage rises steadily as overcharging proceeds, which can lead to a rapid increase in battery temperature, but because the battery voltage exceeds 4.5 V when the battery temperature begins to rise rapidly, if the detected set voltage of the sub-control means 40 is set to 4.45 V as above, the first PTC device 21 will be tripped and charging current restricted before the battery temperature begins to rise rapidly, so battery damage caused by prolonged overcharging is prevented.

Also, the sub-control means 40 maintains the state in which prolonged overcharging was detected and keeps the third FET 41 ON until a voltage below a specific voltage that is lower than the detected set voltage in the prolonged overcharging state is detected. Therefore, the state in which the prolonged overcharging was detected by the sub-control means 40 is maintained, and damage to the rechargeable battery 3 by abnormal operation of the charger or the main protective circuit A is prevented.

The heating of the first PTC device 21 by the second PTC device 22 is indirect in the above structure, so it is essential that good thermal conduction be achieved by heat-coupling, and in this embodiment, the first PTC device 21 and the second PTC device 22 constitute an integrally structured protective element 10. The details of this protective element 10 will be described below.

Figure 7:
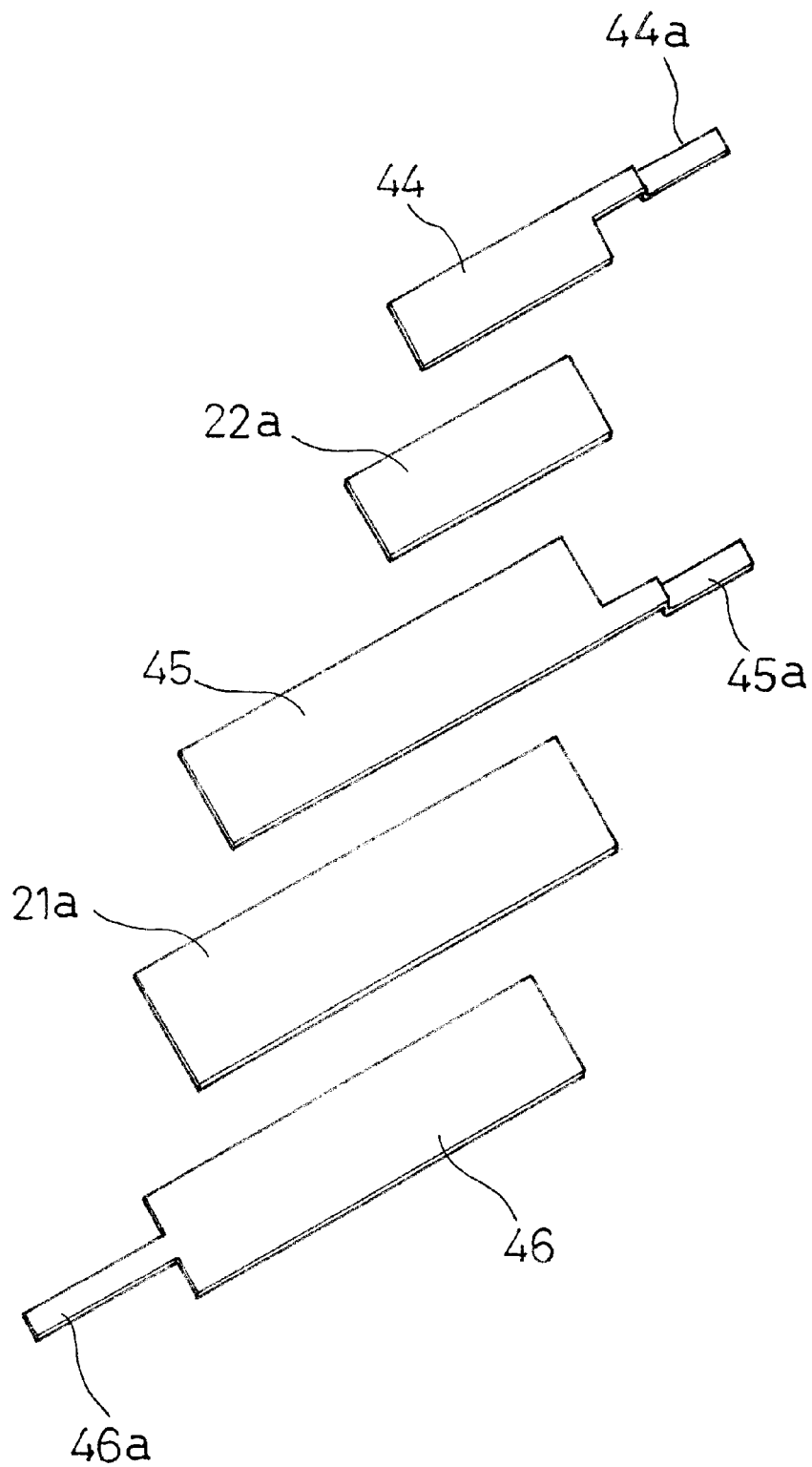
FIG. 7 is an oblique view illustrating the exploded structure of a protective element.
Figure 8A:
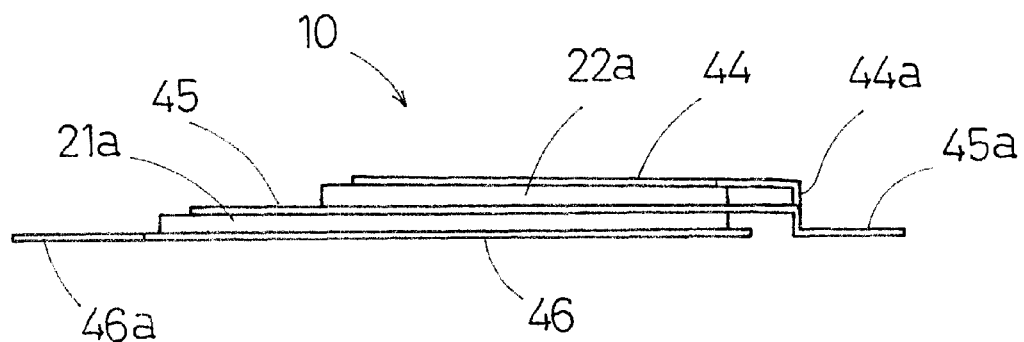
FIG. 8A is a side view of the protective element.
Figure 8B:
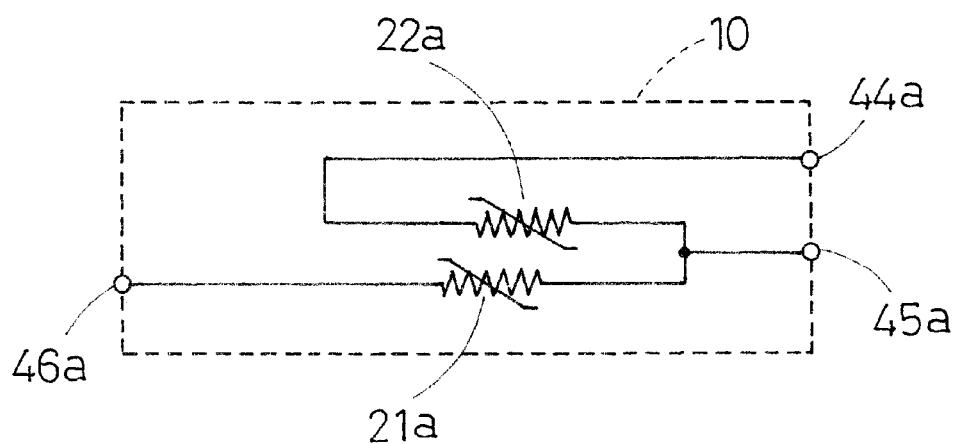
FIG. 8B is an electrical symbol diagram of the protective element.

FIG. 7 is an exploded view of the protective element 10. A middle electrode material 45 is disposed between a first PTC element 21a and a second PTC element 22a, a lower electrode material 46 is disposed on the outside of the first PTC element 21a, and an upper electrode material 44 is disposed on the outside of the second PTC element 22a. As shown in FIG. 8A, these components are joined together and integrally laminated. The electrode materials 44, 45, and 46 joined to the first and second PTC elements 21a and 22a are formed in external sizes that are slightly smaller than the PTC elements 21a and 22a opposite thereto, and are joined together by soldering or another such joining means with the exposed edges of the PTC elements 21a and 22a surrounding them. Leads 44a, 45a, and 46a for wiring connections are formed extended from the electrode materials 44, 45, and 46, respectively. Machining the leads 44a, 45a, and 46a so that they are located within the same plane will facilitate mounting on the circuit substrate constituting the protective circuit. The protective element 10 formed in this way is depicted by electrical symbols in FIG. 8B, in which the first PTC device 21 and the second PTC device 22 are integrated in a heat-coupled state.

As shown in FIG. 6, the first PTC device 21 constituting this protective element 10 is serially connected to the rechargeable battery 3, and when an excessively large current flows due to short-circuiting or the like, this current causes the self-generation of heat, and the resistance increases sharply once the temperature reaches the trip point, so the input and output current of the rechargeable battery 3 is restricted and excessively large current prevented. Also, as mentioned above, when a voltage indicating a prolonged overcharging state is detected by the sub-control means 40, the sub-control means 40 turns ON the third FET 41 and sends power to the second PTC device 22. This raises the temperature of the second PTC device 22 and heats the first PTC device 21. Once this heating trips the first PTC device 21, the flow of charging current to the rechargeable battery 3 is restricted by the same operation for preventing excessively large current as above.

Figure 9:
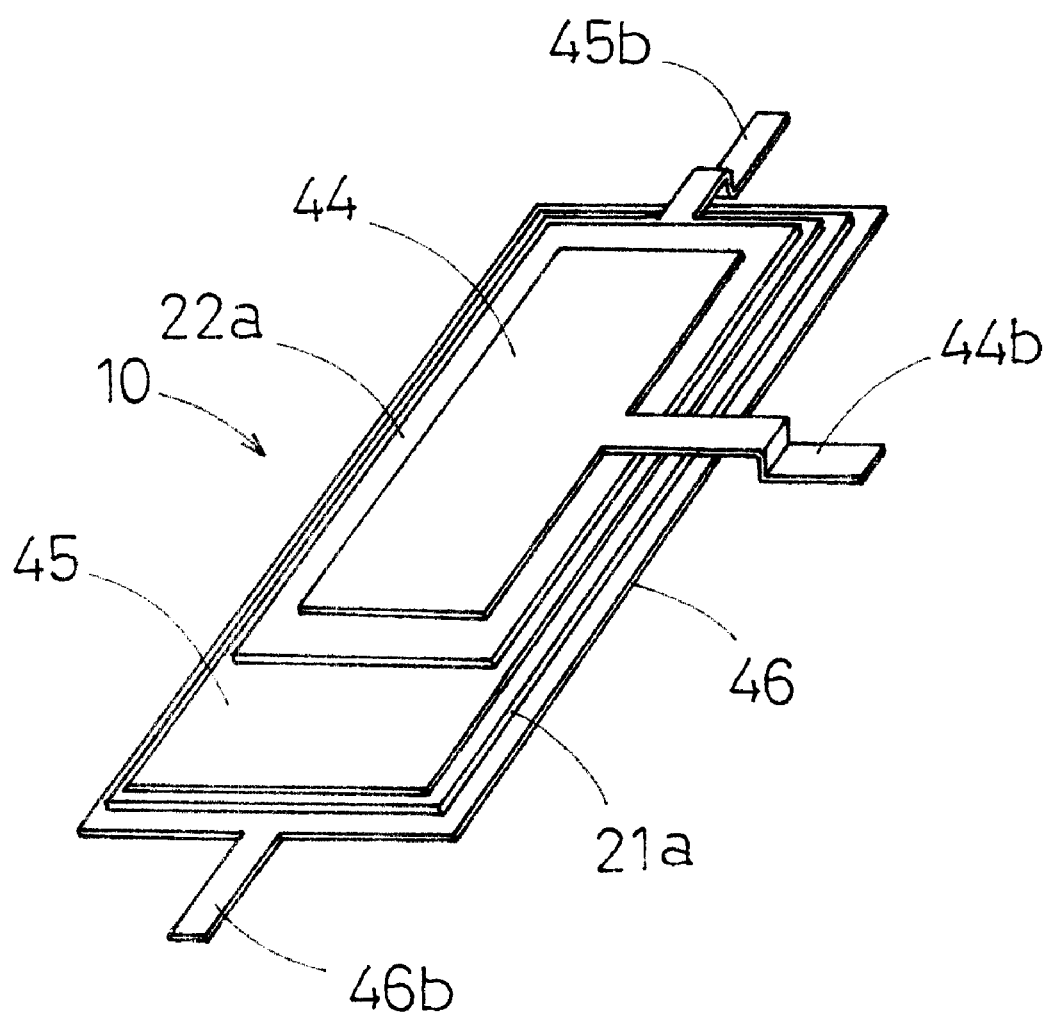
FIG. 9 is an oblique view of another aspect of a protective element.

As shown in FIG. 9, the leads of the protective element 10 can also be formed such that leads 44b, 45b, and 46b extend in three directions from the electrode materials 44, 45, and 46. If the electrode materials 44, 45, and 46 are formed from a copper-nickel alloy, the product will lend itself very well to soldering and so forth, and will also have excellent thermal conductivity for heat-coupling. This copper-nickel alloy need not be used for all the electrode materials 44, 45, and 46, and can instead be used selectively for just the middle electrode material 45, which becomes a thermal conductor for heat-coupling. The same function can also be obtained by using a clad material made from a copper-nickel alloy and nickel instead of a copper-nickel alloy alone.

The first PTC device 21 and the second PTC device 22 can comprise a combination of shapes, sizes, and electrical characteristics selected as desired. The shape, size, and electrical characteristics of the first PTC device 21 are selected so that resistance will be as low as possible under normal circumstances, the drop in voltage caused by the input and output current of the rechargeable battery 3 will be kept low, and an excessively large current over the set excessively large current value will raise the temperature quickly, drive up the resistance, and result in tripping. Meanwhile, the shape, size, and electrical characteristics of the second PTC device 22 are selected so that the resistance is ordinarily high, the amount of heat generated when power is turned ON is greater, and the resulting temperature is high enough to trip the first PTC device 21. The protective element 10 described above consists of a combination of two types of PTC devices, but heating by heat-coupling can be promoted by sandwiching the first PTC device 21 between two of the second PTC devices 22. In another structure, what heats the first PTC device 21 is not a PTC device, but a resistor or the like that raises the temperature through current conduction.

Figure 10:
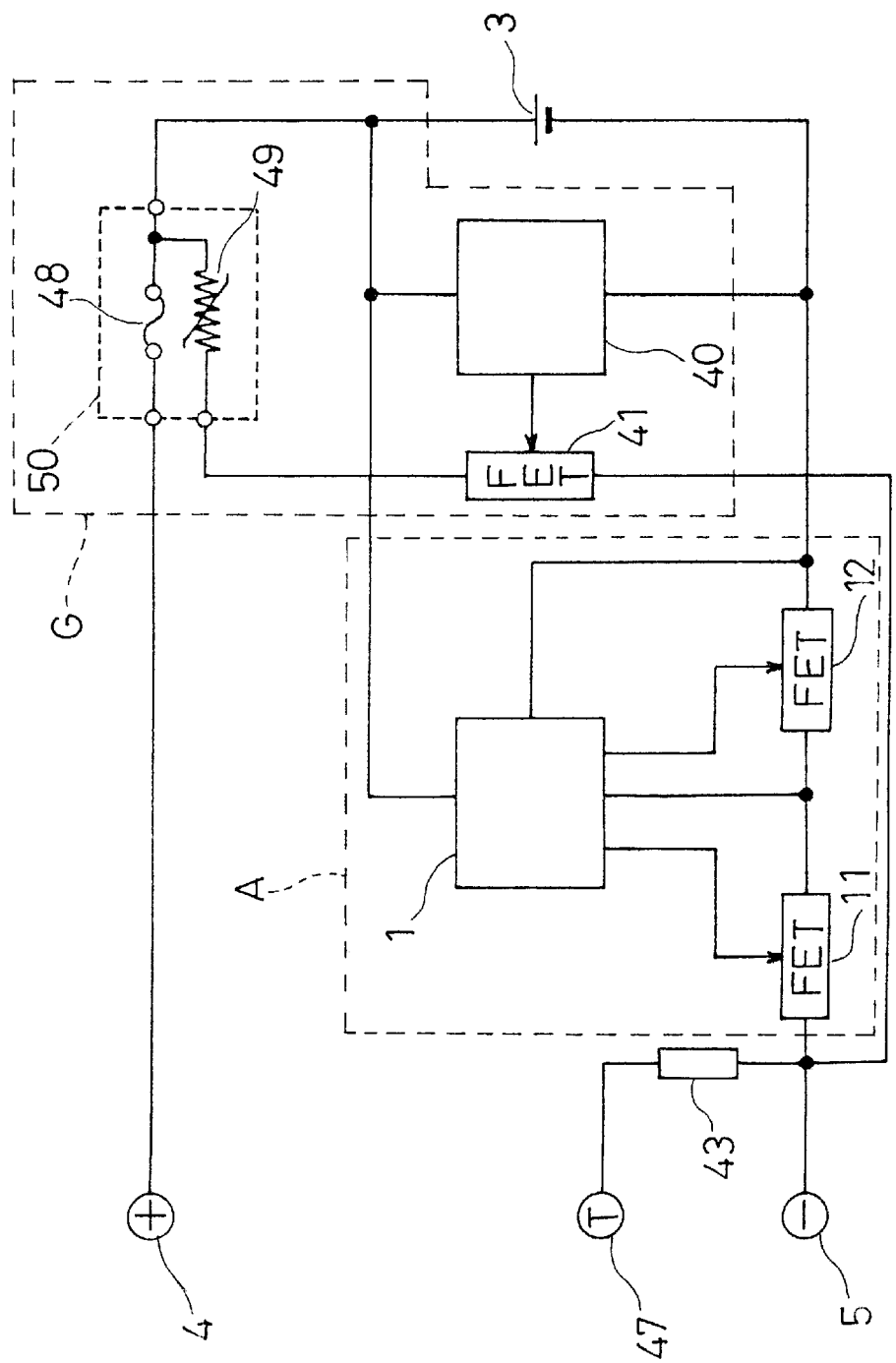
FIG. 10 is a block diagram of the structure of the battery protective circuit according to a fifth embodiment of the present invention.

Next, the battery protective circuit pertaining to a fifth embodiment of the present invention will be described. As shown in FIG. 10, this structure makes use of protective element 50 that combines a heating PTC device 49 and a temperature fuse 48, and the rest of the structure is the same as in the fourth embodiment. Those components that are the common to both embodiments are labeled the same and will not be described.

In FIG. 10, if the third FET 41 is turned ON when the sub-control means 40 detects a detected set voltage in a prolonged overcharging state, current will flow to the heating PTC device 49, the temperature will rise, and the temperature fuse 48 will be heated. When the temperature fuse 48 is melted by this heating with the heating PTC device 49, charging current is shut off from the rechargeable battery 3, and damage to the rechargeable battery 3 by prolonged overcharging is prevented.

Figure 11A:
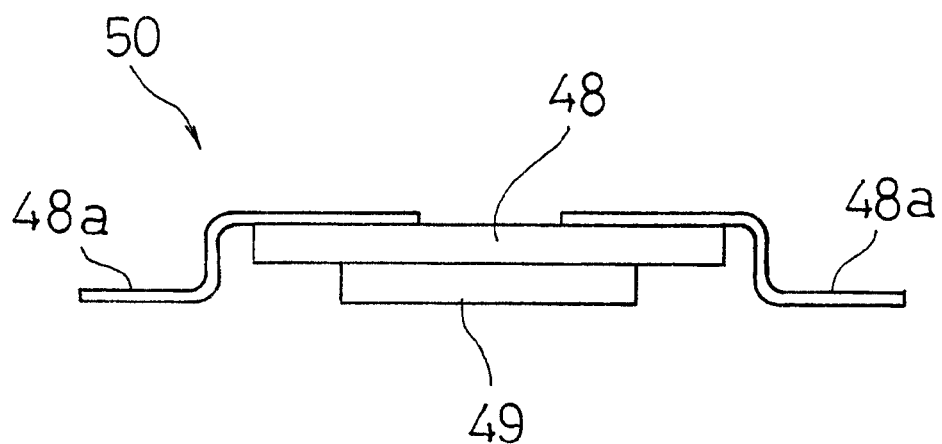
FIG. 11A is a side view of the protective element according to the same embodiment.
Figure 11B:
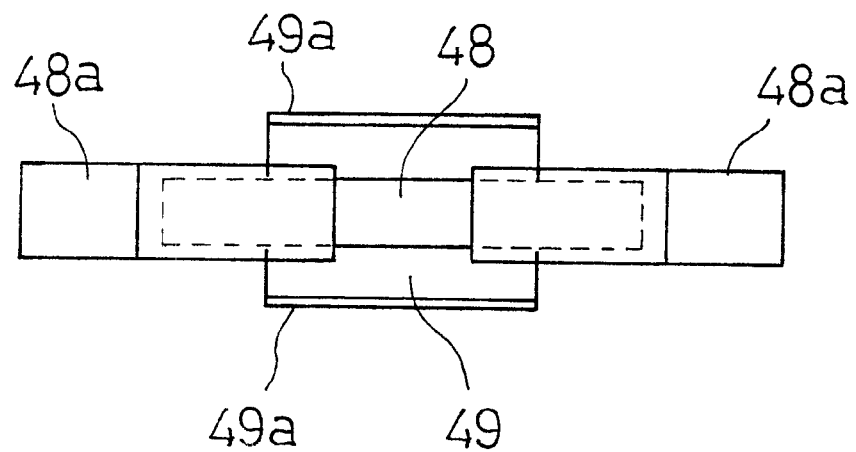
FIG. 11B is a plan view of the protective element according to the same embodiment.
Figure 12:
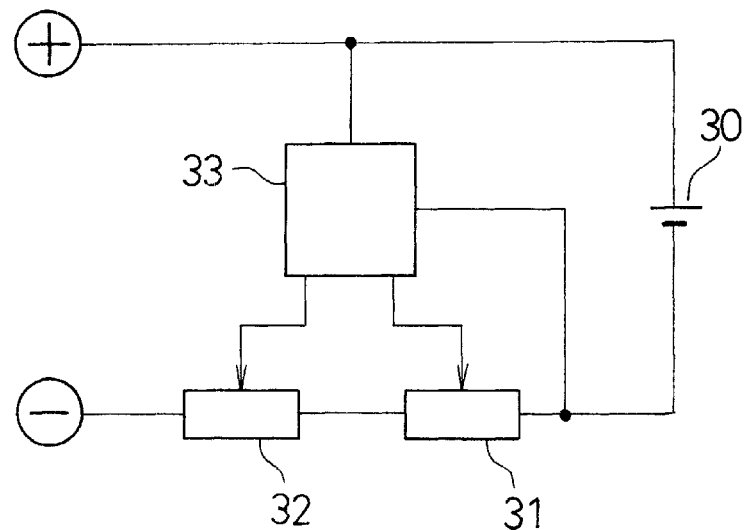
FIG. 12 is a block diagram of the structure of a battery protective circuit in prior art.
Figure 13:
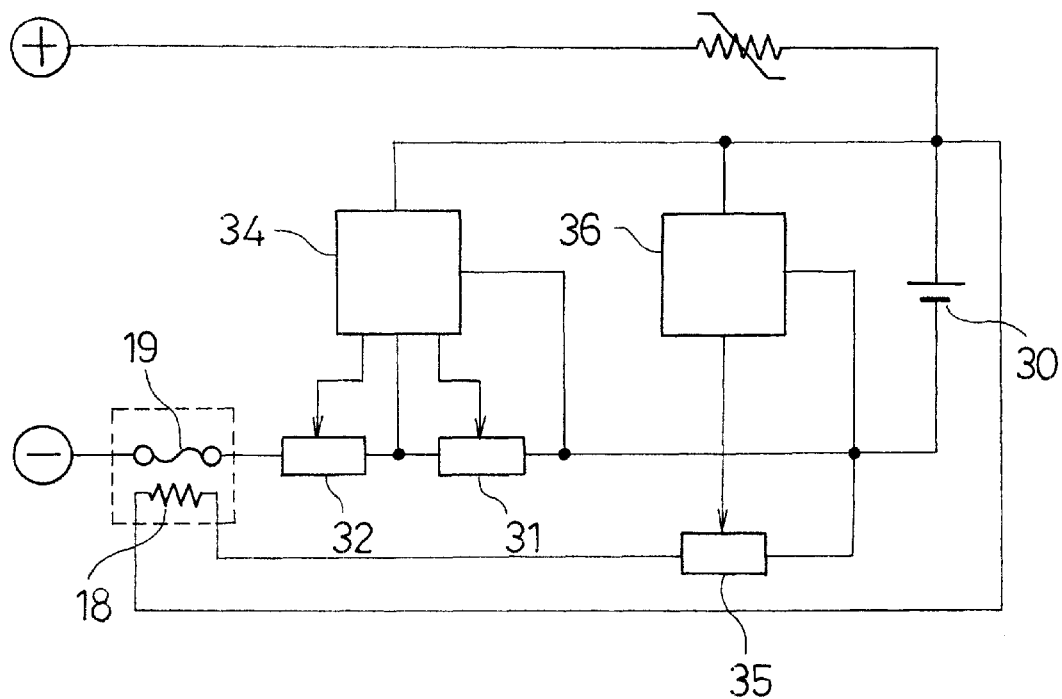
FIG. 13 is a block diagram of the structure of a battery protective circuit in prior art.

As shown in FIGS. 11A and 11B, the above-mentioned protective element 50 comprises the temperature fuse 48 and the heating PTC device 49 laid over one another in a heat-coupled state. As shown in the figures, this protective element 50 has leads 48a attached to the temperature fuse 48, and leads 49a attached to the heating PTC device 49, and is mounted on a circuit substrate to constitute a protective circuit.

The battery protective circuits in the various embodiments described above ameliorate the drawback to redundant protection against overcharging in prior art, namely, that the sub-protective circuit was a non-resettable shutoff means, and therefore could not be checked for proper operation, resulting in lower reliability. Specifically, with the sub-protective circuit B, a voltage below a second charge-prohibiting voltage is applied to the sub-control means 2 to check that the third FET 13 turns ON, and a voltage over the second charge-prohibiting voltage is applied to check that the third FET 13 turns OFF, the result being a highly reliable battery protective circuit.

Also, with the battery protective circuits in the various embodiments, the components can be configured as an integrated circuit, with fewer electronic parts used, allowing a compact, thin rechargeable battery 3 and a compact battery pack to be obtained. Furthermore, it is possible to accommodate the protective circuit inside the rechargeable battery 3 and produce a rechargeable battery 3 with a built-in protective circuit. Also, the use of a redundant anti-overcharging function suppresses the gas generation that would accompany overcharging, so the current shutoff valve that would be used for internal pressure release can be eliminated, further reducing size and thickness, and allowing battery damage caused by overcharging to be prevented even when the mechanical construction makes it difficult to find space to install a current shutoff valve.

The protective elements 10 and 50 described above can also be covered with a thermally insulating material, which suppresses the diffusion of heat outward and affords more efficient heating by the PTC devices 22 and 29.

As described above, with the present invention, the function of preventing overcharging is provided redundantly, and the prevention of battery damage by overcharging can be accomplished electrically rather than with a mechanical current shutoff valve, so it is easy to protect even small rechargeable batteries with little space in which to install a structure for mechanically shutting off current.

Also, since the sub-protective circuit that works in conjunction with the main protective circuit is a resettable type that does not make use of a temperature fuse or other such non-resettable circuit shutoff means, once the overcharging state goes away, the circuit can be reset to a normal state. Furthermore, the operation of the sub-protective circuit can be tested, which was impossible with a non-resettable type, allowing each individual battery protective circuit to be tested for proper operation before shipment of the finished product, which is useful in terms of obtaining a small and highly reliable battery protective circuit.

I claim:

1. A battery protective circuit incorporated in a rechargeable battery, comprising:
   a charge/discharge circuit including:
      a first switching means for protecting the rechargeable battery from overcharging; and
      a second switching means for protecting he rechargeable battery from overdischarging connected in series with the first switching means in the charge/discharge circuit of the rechargeable battery;
   a main protective circuit for:
      detecting a battery voltage between positive and negative electrodes of the rechargeable battery;
      turning on the first switching means when the battery voltage is below a charge-prohibiting voltage, above which charging of the rechargeable battery must be prohibited; and
      turning off the first switching means when the battery voltage is detected to be higher than said charge-prohibiting voltage, and maintaining the OFF state of the first switching means until the detected voltage becomes below a charge-permitting voltage that is lower than said charge-prohibiting voltage; and
   a sub-protective circuit for:
      detecting the battery voltage between the positive and negative electrodes of the rechargeable battery;
      turning on the second switching means when the battery voltage is below a second charge-prohibiting voltage which is higher than the first charge-prohibiting voltage; and
      turning off the second switching means when the battery voltage is detected to be higher than the second charge-prohibiting voltage.

2. The battery protective circuit according to claim 1, wherein the sub-protective circuit maintains the OFF state of the second switching means until a second charge-permitting voltage, which is lower the second charge-prohibiting voltage, is detected.

3. The battery protective circuit according to claim 1, wherein the sub-protective circuit fixes the OFF state of the second switching means after the second charge-prohibiting voltage has been detected.

4. The battery protective circuit according to claim 1, wherein the first switching means and second switching means include power MOSFETs having parasitic diodes therein, wherein said first switching means and second switching means are connected such that the forward direction of the parasitic diodes is the discharge direction of the rechargeable battery.

5. A battery protective circuit incorporated in a rechargeable battery, comprising:
   a charge/discharge circuit including:
      a first switching means for protecting against excessively large current; and a second switching means for preventing overcharging connected in series with the first switching means in the charge/discharge circuit of the rechargeable battery;

a main protective circuit for controlling the first switching means in accordance with a battery voltage across positive and negative electrodes of the rechargeable battery and a discharge current of the rechargeable battery; and a sub-protective circuit for controlling the second switching means in accordance with the battery voltage across positive and negative electrodes of the rechargeable battery, wherein:

the first switching means and the second switching means are turned on, when the rechargeable battery is in a normal condition wherein the voltage across the positive and negative electrodes of the rechargeable battery is within range above a discharge-prohibiting voltage and below a first charge-prohibiting voltage, said discharge-prohibiting voltage being a limit value below which discharging of the rechargeable battery must be prohibited, and said charge-prohibiting voltage being a limit value above which charging of the rechargeable battery must be prohibited;

the first switching means is turned OFF, when the detected discharge current is above a predetermined value;

the first switching means is put in a charging direction OFF/discharging direction ON state when the detected voltage is above said first charge-prohibiting voltage, and maintained in said charging direction OFF/discharging direction ON state until a first charge-permitting voltage, that is lower than the first charge-prohibiting voltage, is detected;

the first switching means is put in a discharging direction OFF/charging direction ON state when the deleted voltage is below said discharge-prohibiting voltage, and maintained in said discharging direction OFF/charging direction ON state until a discharge-permitting voltage, that is higher than said discharge-prohibiting voltage is detected; and the second switching means is turned off when the detected voltage is above a second charge-prohibiting voltage, which is higher than said first charge-prohibiting voltage, and maintained in the OFF state until a second charge-permitting voltage, that is lower than said second charge-prohibiting voltage, is detected.

6. The battery protective circuit according to claim 5, wherein the first switching means is an FET with no parasitic diode therein, and controlled in accordance with gate voltage thereof.

7. A battery protective circuit incorporated in a rechargeable battery, comprising:

a charge/discharge circuit for the rechargeable bakery including:
a PTC device connected in the charge/discharge circuit of the rechargeable battery;
a heating means heat-coupled to the PTC element;
a first switching means connected in series to the PTC device for controlling power supply to said heating means;
a second switching means for preventing overcharging connected in series with the first switching means in the charge/discharge circuit of the rechargeable battery;

a main protective circuit for:
detecting a battery voltage between positive and negative electrodes of the rechargeable battery;
turning off the first switching means when the detected voltage is below a first charge-prohibiting voltage, above which charging of the rechargeable battery must be prohibited; and
turning on the first switching means for supplying power to the heating means when the detected voltage is above the first charge-prohibiting voltage, and maintaining said ON state of the first switching means until a first charge-permitting voltage, that is lower than said first charge-prohibiting voltage, is detected; and a sub-protective circuit for:
detecting the battery voltage between the positive and negative electrodes of the rechargeable battery;
turning on the second switching means when the detected voltage is below a second charge-prohibiting voltage that is higher than the first charge-prohibiting voltage; and
turning off the second switching means when the detected voltage is above the second charge-prohibiting voltage, and maintaining the OFF state of the second switching means until a second charge-permitting voltage, which is lower than said second charge-prohibiting voltage, is detected.

8. The battery protective circuit according to claim 7, wherein the heating means is a second PTC device heat-coupled to the first PTC device.

9. A battery protective circuit for a rechargeable battery, comprising:

voltage detection means connected in series between positive and negative electrodes of the rechargeable battery for detecting a battery voltage and outputting a control signal when a voltage exceeding a predetermined value is detected;

a PTC device serially connected to the voltage detection means;

heating means, which heats up by electrical conduction, connected to the voltage detection means and heat-coupled to the PTC device; and switching means for turning on the heating means accordance with the control signal from the voltage detection means.

10. The battery protective circuit according to claim 9, wherein the voltage exceeding a predetermined value detected by the voltage detection means is set higher than the voltage at which an overcharging state is detected.

11. The battery protective circuit according to claim 9, wherein the heating means is a second PTC device heat-coupled to the PTC device.

12. A battery protective circuit for a rechargeable battery, comprising:

voltage detection means connected across positive and negative electrodes of a rechargeable battery for detecting a battery voltage and outputting a control signal when a voltage exuding a predetermined value is detected;

a temperature fuse serially connected to the rechargeable battery;

a heating PTC device heat-coupled to the temperature fuse; and switching means for turning on the heating PC device in accordance with the control signal from the voltage detection means.

13. The battery protective circuit according to claim 12, wherein the voltage exceeding a predetermined value detected by the voltage detection means is set higher than the voltage at which an overcharging state is detected.

14. A protective element incorporate in a battery protective circuit for a rechargeable battery, comprising a plurality of PTC elements formed in a flat shape and laminated in a heat-coupled state.

15. The protective element according to claim 14, wherein the plurality of PTC elements have various different shapes, sizes, and electrical characteristics.

16. The protective element according to claim 14, wherein two PTC elements formed in a flat shape are joined together by means of an electrode material interposed between the flat sides thereof, each of the PTC elements being respectively provided with electrode materials joined to their outer sides.

17. The protective element according to claim 16, wherein the electrode materials are made from one of a copper-nickel alloy and a clad material made from a copper-nickel alloy and nickel.

18. The protective element according to claim 16, wherein leads are extended from the electrode materials.

19. The protective element according to claim 18, wherein the leads are extended from the electrode materials in two mutually opposite directions.

20. The protective element according claim 18, wherein the leads are severally formed extending from the electrode materials in different directions.

21. The protective element according claim 16, wherein the electrode materials are formed in smaller outer dimension than the PTC elements to which they are joined.

22. A protective element incorporates in a battery protective circuit for a rechargeable battery, comprising a temperature fuse, and a PTC device heat-coupled to the temperature fuse.

23. The protective element according to claim 14 or 22, wherein the heat-coupled portion is covered with a thermally insulating material.

24. A protective circuit comprising:
a main control means for detecting the voltage across the positive and negative leads of a battery;
a first switch;
a second switch;
the first switch being serially connected at a connection point to the second switch;
the connection point of the first switch and the second switch connecting to the main control means, wherein the main control means, the first switch and the second switch are connected to prevent overcharging of rechargeable battery.

25. A protective circuit according to claim 24, wherein the first switch and the second switch include power MOSFETs having parasitic diodes.

26. A protective circuit comprising:
a main control means for detecting the voltage across the positive and negative leads of a battery;
a first switch;
a protective element;
the first switch being serially connected to the protective element;
the main control means connecting to the first switch so that the main control means controls the first switch, wherein the main control means, the first switch and the protective element are connected to control power supply to the battery.

27. A protective circuit according claim 26, wherein the protective element includes a PTC device and a heating means heat coupled to the PTC device.

28. A protective circuit according to claim 27, further comprising a resistor coupled across the heating means.

29. A protective circuit according to claim 26, wherein the protective element includes a PTC device and a fuse.

30. A protective circuit according to claim 29, wherein the fuse is a temperature fuse.

* * * * *